Dec. 28, 1926.

1,612,615

E. COLLINS

COMBINED TEA AND COFFEE POT

Filed May 23, 1925

Inventor
Edward Collins
By Lancaster and Allwine
Attorneys

Patented Dec. 28, 1926.

1,612,615

UNITED STATES PATENT OFFICE.

EDWARD COLLINS, OF MULGRAVE, NOVA SCOTIA, CANADA.

COMBINED TEA AND COFFEE POT.

Application filed May 23, 1925. Serial No. 32,429.

The present invention relates to a combined tea and coffee pot, and the primary object of the invention is to provide an improved pot of this character whereby tea and coffee may be made in a single container and independently poured or dispensed from the container in accordance with the beverage desired.

A further object of the invention is to provide a device of this character having independent compartments for the tea and coffee, and with the tea compartment so arranged with respect to the coffee compartment, as to cause the tea to be steeped upon placing of the pot over a heat for boiling of the coffee.

A still further object of the invention is to provide a device of this character wherein the independent spouts, which are connected with the separate compartments of the pot, are provided at their outlet openings with independently operated closure members for controlling the flow of liquid from either compartment.

Other objects and advantages of the invention will be apparent during the course of the following detailed description, taken in connection with the accompanying drawing, forming a part of this specification, and in which drawing.

Figure 1:
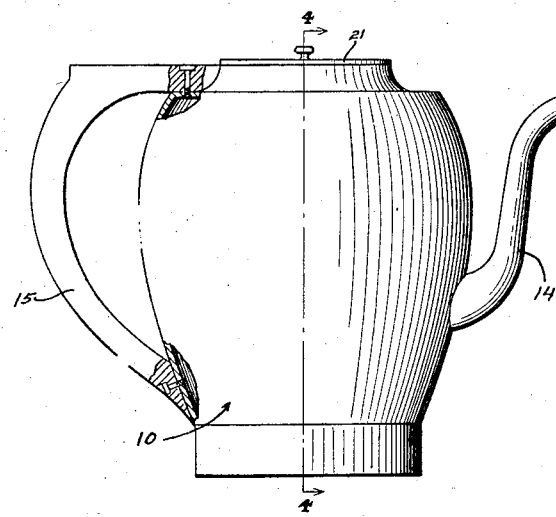
Figure 1 is a side elevation of the improved combined tea and coffee pot, parts being broken away for showing the manner of attachment of the handle.
Figure 2:
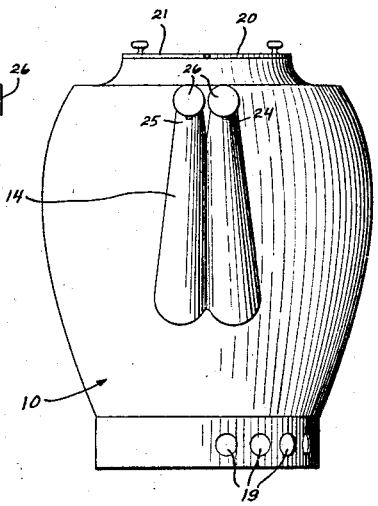
Figure 2 is a front elevation of the improved pot.
Figure 3:
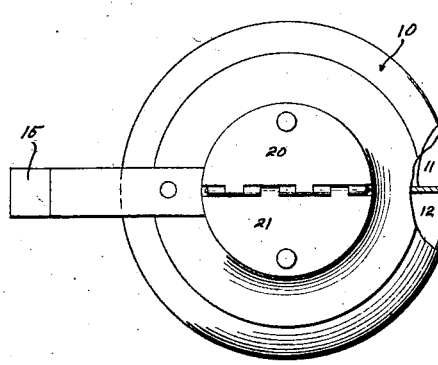
Figure 3 is a top plan view of the pot, parts being broken away to disclose details of construction.
Figure 4:
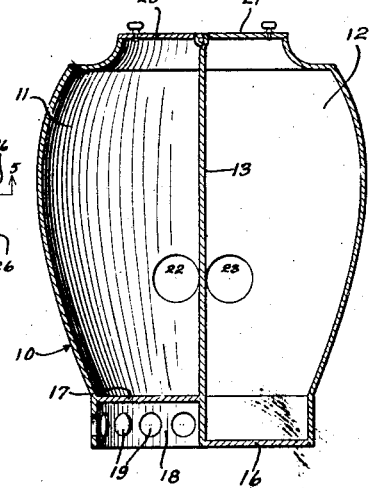
Figure 4 is a central vertical section taken on the line 4—4 of Figure 1.
Figure 5:
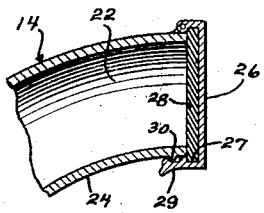
Figure 5 is an enlarged sectional view taken on line 5—5 of Figure 3.

Referring to the drawing in detail, and wherein similar reference characters designate corresponding parts throughout the several views; 10 may generally designate the main body of the pot, and which may be formed of any desired or suitable material. Dividing the body 10 into independent compartments 11 and 12, is a central vertically disposed partition 13 which extends in a direction from the spout structures generally designated by the numeral 14, to the handle 15. As is clearly shown in Figure 4, this partition 13 extends from the very bottom edge of the pot to a position in a plane with the top edge of the pot. The bottom wall 16 of the coffee compartment 12, lies flush with the bottom of the pot body 10, while the bottom wall 17 of the tea compartment 11 is spaced above the bottom edge of the pot body for providing an air space 18 beneath the tea compartment 11 as is clearly illustrated in Figure 4. Air escape openings 19 are provided in the pot body 10 below the bottom wall 17, and extend to the partition wall 13, for permitting heat to escape from the space 18 when the pot is placed upon a stove.

Hingedly connected to the top edge of the partition wall 13, are two semi-circular shaped covers 20 and 21 which act as independent closures for the compartments 11 and 12 respectively.

The spout structure 14, which extends from the front portion of the pot body 10, comprises a pair of separate passageways 22 and 23 which communicate with the compartments 11 and 12 respectively. The spout structure 14 divides at its forward end for forming slightly spaced spout sections 24 and 25. Hingedly connected to the upper edge of each spout section 24 and 25, are caps 26 which are adapted to close the outlet openings of the passageways 22 and 23. These caps 26 are each provided with an annular groove 27 for retaining a disc shaped packing 28 which engages the forward edge of the spout section in a manner to seal one passageway when it is desired to dispense a beverage from any desired compartment 11 or 12. A spring lip 29 is provided at the lower edge of each cap 26 for yieldably engaging a lug 30 provided beneath each of the spout sections 24 and 25. Thus it will be seen that a beverage may be poured from either the compartment 11 or 12, by merely releasing the desired cap 26.

It will be apparent that when the pot is placed upon a stove, the heat will readily cause the coffee in the compartment 12 to boil, whereas the tea which is in the compartment 11 will merely be steeped, due to the fact that the compartment 11 will not be in direct contact with the stove, and that the openings 19 will permit of the rising heat to readily escape from beneath the compartment 11.

Changes in detail may be made to the specific form of the invention herein shown and described without departing from the spirit of the invention, or the scope of the following claims.

I claim:

1. In a combined tea and coffee pot, the combination, of a body portion, a partition in the body portion providing independent compartments, one of said compartments having its bottom wall disposed in a plane above the bottom wall of the companion compartment, a spout structure having independent passageways communicating with each of said compartments, and independently operable closure means for the outlet openings of said passageways.

2. In a combined tea and coffee pot, the combination, of a body, a partition wall in said body adapted to extend from the bottom edge of the body to the top edge thereof for dividing the body into independent compartments, a bottom wall for one of said compartments lying flush with the bottom edge of the body, a bottom wall for the other compartment lying in a plane above the bottom edge of the body, a spout structure having independent passageways communicating with each of said compartments, and independently operable closure means for the outlet openings of said passageways.

3. In a combined tea and coffee pot, the combination, of a body, a partition wall in said body adapted to extend from the bottom edge of the body to the top edge thereof for dividing the body into independent compartments, a bottom wall for one of said compartments lying flush with the bottom edge of the body, a horizontal bottom wall disposed in the companion compartment upwardly of the bottom edge of the body and providing an air space below the compartment, said portion of the body extending below the last mentioned bottom wall being provided with air escape openings for the air space, a spout structure having independent passageways communicating with each of said compartments, and independently operable closure means for the outlet openings of said passageways.

EDWARD COLLINS.